United States Patent
Moon et al.

(10) Patent No.: US 12,034,146 B2
(45) Date of Patent: Jul. 9, 2024

(54) ELECTRODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Gi Hyeon Moon, Daejeon (KR); Jong Hyuk Lee, Daejeon (KR); Mi Ryeong Lee, Daejeon (KR); Hee Gyoung Kang, Daejeon (KR)

(73) Assignee: SK On Co., Ltd., Seoul (KR)

(*) Notice: Subject to any disclaimer, the term of this patent is extended or adjusted under 35 U.S.C. 154(b) by 0 days.

(21) Appl. No.: 18/351,183

(22) Filed: Jul. 12, 2023

(65) Prior Publication Data
US 2024/0170642 A1    May 23, 2024

(30) Foreign Application Priority Data

Nov. 22, 2022  (KR) .................. 10-2022-0157578
Mar. 3, 2023   (KR) .................. 10-2023-0028636

(51) Int. Cl.
| | | |
|---|---|---|
| *H01M 4/131* | (2010.01) | |
| *H01M 4/64*  | (2006.01) | |
| *H01M 10/05* | (2010.01) | |
| *H01M 10/052*| (2010.01) | |
| *H01M 4/02*  | (2006.01) | |

(52) U.S. Cl.
CPC ............ *H01M 4/131* (2013.01); *H01M 4/64* (2013.01); *H01M 10/05* (2013.01); *H01M 10/052* (2013.01); *H01M 2004/021* (2013.01)

(58) Field of Classification Search
CPC ....... H01M 4/13; H01M 4/131; H01M 10/052
See application file for complete search history.

(56) References Cited

U.S. PATENT DOCUMENTS

| | | | | |
|---|---|---|---|---|
| 2005/0069775 A1* | 3/2005 | Hwang | .................. | H01M 4/587 |
| | | | | 429/231.95 |
| 2010/0221613 A1* | 9/2010 | Ueki | .................. | H01M 4/1391 |
| | | | | 429/231.95 |
| 2019/0115619 A1* | 4/2019 | Yamamoto | ............ | H01M 4/661 |
| 2021/0143433 A1 | 5/2021 | Lee et al. | | |

FOREIGN PATENT DOCUMENTS

| | | |
|---|---|---|
| JP | 2011150942 A | 8/2011 |
| KR | 1020100056563 A | 5/2010 |
| KR | 1020140125970 A | 10/2014 |
| KR | 1020150062989 A | 6/2015 |
| KR | 1020170099748 A | 9/2017 |
| KR | 1020190085355 A | 7/2019 |
| KR | 102115602 B1 | 5/2020 |

OTHER PUBLICATIONS

Kvalvik et al., "LiF by atomic layer deposition—Made easy", Journal of Vacuum Science, American Institute of Physics, 2020, pp. 050401-1--05040-5, vol. 38, No. 5.

* cited by examiner

*Primary Examiner* — Kenneth J Douyette
(74) *Attorney, Agent, or Firm* — The Webb Law Firm

(57) ABSTRACT

An electrode for a lithium secondary battery includes an electrode current collector, an electrode active material layer formed on at least one surface of the electrode current collector and including electrode active material particles, and a lithium salt-containing coating formed on at least portions of surfaces of the electrode active material particles or at least a portion of the surface of the electrode active material layer. The electrode for a lithium secondary battery may have a predetermined surface roughness.

13 Claims, 4 Drawing Sheets

ELECTRODE FOR LITHIUM SECONDARY BATTERY AND LITHIUM SECONDARY BATTERY INCLUDING THE SAME

CROSS-REFERENCE TO RELATED APPLICATIONS

This application claims priority to Korean Patent Application Nos. 10-2022-0157578 filed Nov. 22, 2022 and 10-2023-0028636 filed Mar. 3, 2023, the disclosures of each of which are hereby incorporated by reference in their entireties.

BACKGROUND OF THE INVENTION

1. Field of the Invention

The present disclosure relates to an electrode for a lithium secondary battery and a lithium secondary battery comprising the same. More specifically, the present invention relates to an electrode for a lithium secondary battery comprising an electrode active material, and a lithium secondary battery comprising the electrode.

2. Description of the Related Art

A secondary battery is a battery that can be repeatedly charged and discharged, and is widely applied to portable electronic communication devices such as camcorders, mobile phones, and laptop computers with the development of information communication and display industries. Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

The lithium secondary battery may include an electrode assembly including a cathode, an anode, and a separation membrane (separator), and an electrolyte immersing the electrode assembly. In addition, the lithium secondary battery may further include an outer case having, e.g., a pouch-shaped for accommodating the electrode assembly and the electrolyte are housed.

For example, the electrode may include electrode active material particles capable of intercalating and deintercalating lithium ions. When repeatedly charging/discharging the secondary battery, mechanical and chemical damage such as crack of the particles may occur, and contact between the active material particles may be deteriorated and short circuit may occur.

When changing the composition and structure of the electrode active material in order to improve stability of the active material particles, conductivity may be reduced to cause a decrease in an output of the secondary battery. Therefore, development of a secondary battery electrode capable of securing life-span stability and output/capacity characteristics is required.

For example, Korean Patent Laid-Open Publication No. 2017-0099748 discloses an electrode assembly for a lithium secondary battery and a lithium secondary battery including the same, but there is a limitation in securing sufficient high rate and high capacity characteristics.

SUMMARY OF THE INVENTION

According to an aspect of the present disclosure, there is provided an electrode for a lithium secondary battery having improved electrical properties and stability.

According to an aspect of the present disclosure, there is provided a lithium secondary battery comprising the electrode having improved electrical properties and stability.

To achieve the above objects, according to an aspect of the present invention, there is provided an electrode for a lithium secondary battery comprising: an electrode current collector; an electrode active material layer which is disposed on at least one surface of the electrode current collector and comprises electrode active material particles; and a lithium salt-containing coating which is formed on at least portions of surfaces of the electrode active material particles and/or at least a portion of a surface of the electrode active material layer, wherein the electrode has a arithmetic average value of surface roughness (Ra) represented by Equation 1 below:

$$Ra \leq 25 \text{ nm} \qquad [\text{Equation 1}]$$

wherein, in Equation 1, Ra is a value obtained by calculating an arithmetic average of surface roughness values measured in 20 or more measurement regions of the surface of the electrode for the lithium secondary battery using an atomic force microscopy in a scan range of 0.5 μm×0.5 μm.

For example, the arithmetic average value of surface roughness (Ra) may be 0.1 to 25 nm.

In some embodiments, a surface roughness value measured in each of the measurement regions may be an arithmetic average value of roughness values excluding a maximum value and a minimum value among the roughness values measured 15 or more times in a scan range of 0.5 μm×0.5 μm for each of the measurement regions.

In some embodiments, a standard deviation of the surface roughness values measured in the measurement regions of the surface of the electrode for a lithium secondary battery may be 2.5 nm or less.

In some embodiments, the lithium salt-containing coating may have a continuous film shape which covers the surfaces of the electrode active material particles or the surface of the electrode active material layer.

In some embodiments, the lithium salt-containing coating may have a thickness of 1 nm to 1,000 nm.

In some embodiments, the lithium salt-containing coating may comprise at least one of LiCl, LiF, $Li_3PO_4$, $LiBO_2$, $LiIO_2$, $Li_2CO_3$, $Li_2B_4O_7$, $Li_2SO_4$, LiBr, LiI, $LiNO_3$, $Li(CF_3CO_2)$, $Li((CH_3)_3SiO)$, $Li(CH_3O)$, $LiCH_2COO$, $Li(CO_2CH_3)$, $(CH_3)_2CHOLi$ (lithium isopropoxide), $CH_3CH(OH)COOLi$ (lithium lactate), $Li_2S$, LiOH, $Li_2O$, $Li_2O_2$, $CH_3CH_2OLi$ (lithium ethoxide), $C_6H_5OLi$ (lithium phenoxide) and/or $C_7H_5LiO_2$ (lithium benzoate).

In some embodiments, a content of the lithium salt-containing coating measured by high performance liquid chromatography (HPLC) may be 20 ppm to 600 ppm based on a total weight of the electrode active material layer.

In some embodiments, the lithium salt-containing coating may be formed on both the surfaces of the electrode active material particles and the surface of the electrode active material layer.

In some embodiments, the lithium salt-containing coating may have a lithium ion conductivity of $1 \times 10^{-7}$ S/cm or more and an electronic conductivity of $1 \times 10^{-5}$ S/cm or less.

In some embodiments, the electrode for a lithium secondary battery may be an anode or a cathode.

According to another aspect of the present invention, there is provided a lithium secondary battery comprising: a cathode; and an anode disposed to face the cathode, wherein at least one of the cathode and the anode is the above-described electrode for a lithium secondary battery.

In some embodiments, the lithium secondary battery may further comprise an electrolyte in which the cathode and the anode are impregnated, wherein the lithium salt-containing coating has a solubility of 1 g/L or less in the electrolyte.

The electrode for a lithium secondary battery according to example embodiments may comprise a lithium salt-containing coating formed on the surface of an electrode active material and/or the surface of an electrode active material layer. Direct contact between the electrode active material and the electrolyte may be suppressed by the lithium salt-containing coating, and volume expansion and structural collapse of the electrode active material may be prevented.

The electrode for a lithium secondary battery may have a predetermined arithmetic average value of surface roughness. Accordingly, a side reaction between the electrode active material and the electrolyte may be further suppressed. Thus, consumption of the electrolyte and irreversible capacity loss may be reduced, and rapid charging and cycle properties of the lithium secondary battery may be improved.

The lithium salt-containing coating has high lithium ion conductivity and low electronic conductivity, thereby lifespan characteristics and structural stability of the electrode active material may be improved even during repeated charging/discharging behaviors under severe high temperature/high humid conditions. Accordingly, durability and charge/discharge capacities of the lithium secondary battery may be improved without decreasing initial efficiency and high charging speed.

DESCRIPTION OF THE INVENTION

Figure 1:
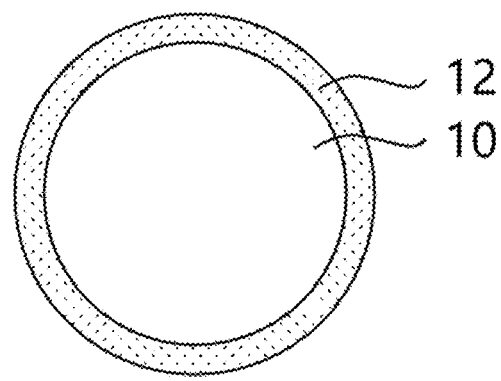
FIG. 1 is a schematic image illustrating an electrode active material having a lithium salt-containing coating according to example embodiments.

According to embodiments of the present disclosures, an electrode for a lithium secondary battery comprising a lithium salt-containing coating and having a predetermined arithmetic average value of surface roughness is provided.

In addition, a lithium secondary battery comprising the above-described electrode for a lithium secondary battery is provided.

Hereinafter, various features of the disclosed technology will be described in detail with reference to embodiments and the accompanying drawings.

As used herein, the singular form of "a", "an", and "the" include plural referents unless the context clearly states otherwise.

For the purposes of this specification, unless otherwise indicated, all numbers expressing quantities of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Unless otherwise specifically defined in the present specification, values out of the numerical range that may occur due to experimental errors or rounded values also fall within the defined numerical ranges. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. The expression "comprise(s)" as used herein is intended to be an open-ended transitional phrase having an equivalent meaning to "include(s)", "contain(s)", "have (has)", or "are (is) characterized by", and does not exclude elements, materials, or steps, all of which are not further recited herein.

<Electrode for Lithium Secondary Battery>

The electrode for a lithium secondary battery may comprise an electrode current collector and an electrode active material layer disposed on at least one surface of the electrode current collector and comprising electrode active material particles. A lithium salt-containing coating may be formed on surfaces of the electrode active material particles and/or a surface of the electrode active material layer.

For example, the lithium salt-containing coating may be formed on at least a portion of the surface of the electrode active material. For example, the lithium salt-containing coating may be formed on at least a portion of the surface of the electrode active material layer.

The lithium salt-containing coating is formed on the surface of the electrode active material and/or the surface of the electrode active material layer, so that direct exposure of the electrode active material particles to an electrolyte may be prevented. Therefore, a side reaction between the electrode active material particles and the electrolyte may be suppressed thus to prevent irreversible decomposition of the electrolyte.

According to example embodiments, the electrode for a lithium secondary battery may have an arithmetic average value of surface roughness (Ra) represented by Equation 1 below.

$$Ra \leq 25 \text{ nm} \qquad \text{[Equation 1]}$$

In Equation 1, the arithmetic average value of surface roughness (Ra) may be obtained from surface roughness values measured on the surface of the electrode active material layer using an atomic force microscopy (AFM) in a scan range of 0.5 μm×0.5 μm.

The scan range of 0.5 μm×0.5 μm may be a range of a portion of the surface of the electrode for a lithium secondary battery or a portion of the surface of the electrode active material particle designated in a surface direction of the electrode active material layer when observing the surface with the atomic force microscopy (AFM).

For example, the Ra of the electrode for a lithium secondary battery may be an arithmetic average value of surface roughness values measured in predetermined regions of the surface of the electrode active material layer using the atomic force microscopy (AFM).

In one embodiment, the Ra of the electrode for a lithium secondary battery may be obtained by measuring the surface roughness values of at least three regions of the electrode. For example, the arithmetic average value of surface roughness (Ra) may be obtained by selecting three or more regions of the surface of the electrode active material layer to measure surface roughness values in each region, and calculating an arithmetic average of the measured surface roughness values.

In one embodiment, measuring the arithmetic average value of surface roughness (Ra) may be performed by arbitrary (randomly) designating 15 or more regions, 30 or more regions, 45 or more regions, 100 or more regions, or 100 to 1000 regions of the surface of the electrode active material layer. As the number of measurement regions is increased, accuracy and reliability of measurement may be more improved. An area of each measurement region may be in a size of about 20 μm×about 20 μm.

In one embodiment, the surface roughness value of each of the measurement regions may be obtained by measuring roughness values in the measurement region multiple times in a scan range of 0.5 μm×0.5 μm for each of the measurement regions, and calculating an arithmetic average of the measured roughness values.

For example, the surface roughness value may be obtained from electrode active material particles present in each measurement region, and may mean a center line average roughness in a direction perpendicular to a surface of the measurement region.

The roughness values in each measurement region may be measured in several directions for each measurement region. For example, the surface roughness value of the measurement region may be obtained by measuring the roughness values in the measurement region in each of 15 or more directions and calculating an arithmetic average of the measured roughness values. For example, the roughness values of each measurement region may be measured 15 times or more, 30 times or more, or 50 to 200 times in several directions. The measurement direction in the measurement region may be randomly selected.

In an embodiment, the surface roughness value of each measurement region may be obtained by calculating an arithmetic average of roughness values excluding a maximum value and a minimum value among the measured roughness values in consideration of measurement error and dispersion.

As the electrode for a lithium secondary battery has an arithmetic average value of surface roughness within the above range, a surface area of the electrode exposed to the electrolyte may be reduced, and a side reaction within the electrode may be suppressed thus to improve life-span characteristics.

For example, when the surface roughness of the electrode active material and/or the electrode active material are/is high, the surface area exposed to the electrolyte may be increased due to an uneven structure. Accordingly, a side reaction between the electrolyte and the electrode active material may be increased, and structural collapse of the electrode active material and depletion of the electrolyte may occur due to repeated charging and discharging.

The lithium salt-containing coating is formed on the surfaces of the electrode active material particles and/or the surface of the electrode active material layer, and the arithmetic average value of surface roughness of the electrode for a lithium secondary battery is adjusted within the above-described range, thereby a side reaction between the electrode active material and the electrolyte may be further suppressed.

For example, as the arithmetic average value of surface roughness of the electrode active material is reduced, contact between the electrode active material and the electrolyte may be suppressed, and as the electronic conductivity is decreased by the lithium salt-containing coating, a side reaction with the electrolyte may be prevented. In addition, the arithmetic average value of surface roughness may be easily adjusted by the lithium salt-containing coating.

In some embodiments, the arithmetic average value of surface roughness of the electrode for a lithium secondary battery may be 0.001 to 25 nm, or 0.1 to 25 nm, or 0.1 to 21 nm. Within the above range, a stable solid electrolyte interface (SEI) layer may be easily formed on the surface of the electrode active material layer during initial driving, and reactivity between the electrode active material and the electrolyte may be further reduced. Accordingly, the life-span characteristics of the battery may be more improved by further preventing the collapse/reproduction of the SEI layer and the consumption of the electrolyte due to the same during repeated charging and discharging.

In some embodiments, a standard deviation of the surface roughness values measured in the measurement regions of the surface of the electrode for a lithium secondary battery may be 2.5 nm or less. For example, the standard deviation may be less than 2.5 nm, 2.3 nm or less, or 2.0 nm or less.

The standard deviation may be an index representing uniformity of the roughness of the surface of the electrode for a lithium secondary battery. For example, as the surface roughness values measured in an arbitrary region of the surface of an electrode for a lithium secondary battery have a low standard deviation or a narrow distribution, a roughness deviation between local regions may be reduced.

For example, as the above-described standard deviation is increased, a portion of the region of the electrode surface may have relatively high roughness. Therefore, since a reaction between the electrode active material and the electrolyte can be concentrated in the corresponding region, such that structural stability of the electrode and life-span characteristics of the electrode active material may be relatively decreased.

According to example embodiments, as both the arithmetic average value of surface roughness (Ra) and the standard deviation of the surface roughness values measured from the surface of the electrode for a lithium secondary battery have a low value, the surface of the electrode may have a low and uniform roughness as a whole. Accordingly, the stability and life-span characteristics of the lithium secondary battery may be further improved.

In some embodiments, the lithium salt-containing coating may cover at least a portion of the surface of the electrode active material and/or at least a portion of the surface of the electrode active material layer. For example, the lithium salt-containing coating may have a continuous film shape which covers a part or all of the surface of the electrode active material and/or a part or all of the surface of the electrode active material layer.

FIG. 1 is a schematic cross-sectional view illustrating an electrode active material comprised in the electrode for a lithium secondary battery according to example embodiments.

Referring to FIG. 1, the electrode for a lithium secondary battery may comprise an electrode active material particle 10 and a lithium salt-containing coating 12 which surrounds the surface of the electrode active material particle 10.

As the lithium salt-containing coating 12 is formed on the surface of the electrode active material particle 10, direct contact between the electrode active material particle 10 and the electrolyte may be prevented, and mechanical/thermal shocks from an outside may be alleviated. Therefore, structural defect and damage to the electrode active material particles 10 may be prevented.

For example, the lithium salt-containing coating 12 may be formed by a wet coating method. For example, the lithium salt-containing coating 12 may be formed on the surfaces of the electrode active material particles 10 by mixing and stirring a mixed solution containing a lithium salt and an organic solvent with the electrode active material particles 10, followed by drying the mixture to evaporate the organic solvent. A heat treatment step may be additionally performed after the drying.

Figure 2:
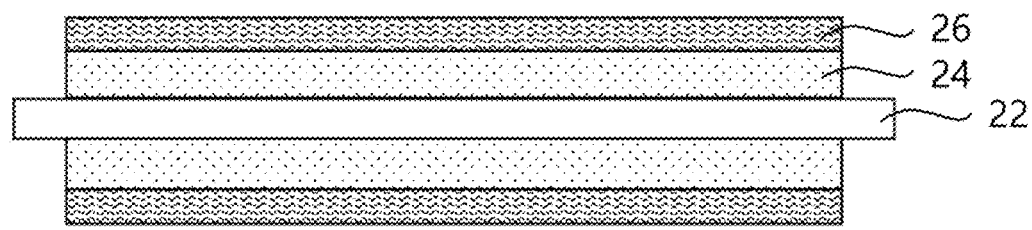
FIG. 2 is a schematic cross-sectional view illustrating an electrode for a lithium secondary battery according to example embodiments.

FIG. 2 is a schematic cross-sectional view illustrating an electrode for a lithium secondary battery according to example embodiments.

Referring to FIG. 2, an electrode 20 for a lithium secondary battery may comprise an electrode current collector 22, an electrode active material layer 24 formed on at least one surface of the electrode current collector 22, and a lithium salt-containing coating 26 which covers at least a portion of the surface of the electrode active material layer 24.

In some embodiments, the electrode active material layer 24 may be formed on both surfaces of the electrode current collector 22. For example, the electrode active material layer 24 may be coated on upper and lower surfaces of the electrode current collector 22, respectively. The electrode active material layer 24 may be directly coated on the surface of the electrode current collector 22.

The lithium salt-containing coating 26 may be formed to cover the electrode active material layer 24. For example, the lithium salt-containing coating 26 may be formed by a wet coating method.

In one embodiment, the lithium salt-containing coating 26 may be formed by applying a mixed solution comprising a lithium salt and an organic solvent to the electrode active material layer 24, followed by drying the mixture. A heat treatment step may be additionally performed after the drying.

In one embodiment, the lithium salt-containing coating 26 may be formed on the electrode active material layer 24 by immersing the electrode active material layer 24 in a solution in which lithium salts are dissolved, then taking out the electrode active material layer 24 and drying. A heat treatment step may be additionally performed after the drying.

In some embodiments, the lithium salt-containing coating may have a thickness of 1 to 1,000 nm, and for example, 1 to 500 nm.

Within the above range, depletion of the electrolyte and oxidation/reduction of the electrode active material due to the contact between the electrode active material and the electrolyte may be more suppressed. In addition, as a lithium movement path in the lithium salt-containing coating is shortened, ionic conductivity may be improved, and the lithium secondary battery may have higher initial efficiency and charge/discharge capacities.

For example, if the thickness of the lithium salt-containing coating is less than 1 nm, it may be relatively difficult to block permeation of the electrolyte due to the thin coating, and a side reaction between the electrode active material and the electrolyte cannot be effectively suppressed. If the thickness of the lithium salt-containing coating is greater than 1,000 nm, resistance may be relatively increased due to the thickly formed coating, and initial efficiency and performance of the lithium secondary battery may be relatively decreased.

In some embodiments, the lithium salt-containing coatings may be formed on both the surfaces of the electrode active material particles and the surface of the electrode active material layer. For example, the lithium salt-containing coating may comprise a first lithium salt-containing coating which covers the surfaces of the electrode active material particles and a second lithium salt-containing coating which covers the surface of the electrode active material layer. In one embodiment, the first lithium salt-containing coating and the second lithium salt-containing coating may comprise the same lithium salt compound, or may comprise different lithium salt compounds.

As the lithium salt-containing coatings are formed on both the surfaces of the electrode active material particles and the surface of the electrode active material layer, penetration of the electrolyte into the electrode active material particles is doubly blocked, thereby further improving life-span characteristics. In addition, since high ion conductivity may be secured, output characteristics and charge/discharge capacities may be further improved.

In some embodiments, a part of the lithium salt-containing coating may be individually distributed and disposed in an island shape on the surface of the electrode active material and/or the surface of the electrode active material layer.

In one embodiment, the lithium salt-containing coating may be disposed in an area of 90% or more of the surface of the electrode active material or an area of 90% or more of the surface of the electrode active material layer, and for example, may be disposed in an area of 95% or more, or 99% or more. Accordingly, deterioration of the electrode active material due to the external environment and charging/discharging may be prevented while maintaining high lithium ion conductivity, and thus initial efficiency and capacity retention rate may be further improved.

In some embodiments, the lithium salt-containing coating may comprise a lithium salt having low solubility and swelling characteristics in an organic solvent. Accordingly, the lithium salt-containing coating may have low reactivity to the electrolyte, high insulation properties, and improved mechanical/chemical stabilities.

For example, since the lithium salt has low electronic conductivity and high stability even under severe high temperature/high humid conditions, a side reaction between the electrode active material and the electrolyte may be suppressed. Therefore, oxidation/reduction of the electrode active material by the electrolyte may be prevented, and structural collapse and crack of the electrode active material due to driving at high temperature/high voltage and external physical impact may be prevented.

The lithium salt may improve a rate of intercalation and deintercalation of lithium ions, and thus, irreversible reaction and capacity loss due to overvoltage occurring during high speed charging may be prevented. In addition, while initial efficiency and high speed charging characteristics are improved due to high lithium ion conductivity and low reactivity to the electrolyte, capacity retention rate and cycle characteristics may be improved.

For example, the lithium salt-containing coating may comprise one or more of LiCl, LiF, $Li_3PO_4$, $LiBO_2$, $LiIO_2$, $Li_2CO_3$, $Li_2B_4O_7$, $Li_2SO_4$, LiBr, LiI, $LiNO_3$, $Li(CF_3CO_2)$, $Li((CH_3)_3SiO)$, $Li(CH_3O)$, $LiCH_2COO$, $Li(CO_2CH_3)$, $(CH_3)_2CHOLi$ (lithium isopropoxide), $CH_3CH(OH)COOLi$ (lithium lactate), $Li_2S$, LiOH, $Li_2O$, $Li_2O_2$, $CH_3CH_2OLi$ (lithium ethoxide), $C_6H_5OLi$ (lithium phenoxide), $C_7H_5LiO_2$ (lithium benzoate) and/or the like. These may be used alone or in combination of two or more thereof.

In one embodiment, the lithium salt-containing coating may comprise $C_7H_5LiO_2$ (lithium benzoate). $C_7H_5LiO_2$ has low reactivity to the electrolyte or organic solvent and has a high transport capacity for lithium ions, such that the charging characteristics and life-span characteristics of the lithium secondary battery may be further improved.

In some embodiments, the lithium salt-containing coating may consist of a lithium salt. For example, the lithium salt-containing coating may not comprise a polymeric component or a polymer such as a binder resin. In this case, a decrease in the lithium ion conductivity and an increase in the resistance due to other components (e.g., the polymeric component or polymer) may be prevented, and electrochemical characteristics of the lithium secondary battery may be further improved.

In some embodiments, a content of the lithium salt-containing coating may be 20 ppm or more based on a total weight of the electrode active material layer. The content of the lithium salt-containing coating may be measured through high performance liquid chromatography (HPLC) analysis.

For example, a ratio of the lithium salt-containing coating to the electrode active material may be calculated by analyzing a peak area (e.g., peak area %) of the lithium salt compound measured through an HPLC analysis graph.

If the content of the lithium salt-containing coating measured by HPLC peak area is less than 20 ppm, the lithium salt-containing coating may not be substantially present on the surface of the electrode active material or the surface of the electrode active material layer. For example, a peak area of less than 20 ppm may be a value measured from a by-product produced from the electrolyte or a cathode.

In one embodiment, the content of the lithium salt-containing coating measured by HPLC may be about 20 to 600 ppm, 50 to 600 ppm, or 100 to 450 ppm based on the total weight of the electrode active material layer. The above-described range may be a content measured after a formation process or initial charging and discharging of the lithium secondary battery. For example, the content of the lithium salt-containing coating measured after fully charging and discharging the lithium secondary battery may be 20 to 600 ppm.

Within the above range, a coating coverage rate of the electrode active material or the electrode active material layer may be increased while further suppressing an increase in the resistance due to the lithium salt-containing coating.

For example, when the content of the lithium salt-containing coating comprised in the electrode measured after initial charging and discharging is greater than 600 ppm based on the total weight of the electrode active material layer, the capacity and energy density of the lithium secondary battery may be relatively reduced.

In some embodiments, the content of the lithium salt-containing coating measured before the formation process of the lithium secondary battery or before initial charging and discharging may be 0.005 to 10 parts by weight ("wt. parts") based on 100 wt. parts of the electrode active material layer, and for example, may be 0.01 to 5 wt. parts.

For example, if the content of the lithium salt-containing coating measured before the formation process is less than 0.005 wt. parts, the coating coverage rate may be decreased due to the decomposition of the lithium salt-containing coating that occurs during an initial charging and discharging process, and life-span characteristics and stability of the electrode for a lithium secondary battery may be relatively decreased.

For example, if the content of the lithium salt-containing coating measured before the formation process is greater than 10 wt. parts, a thick film may be formed on the electrode active material during the initial charging and discharging process, thereby causing an increase in the internal resistance, and a relative decrease in the electrochemical performance.

In one embodiment, the content of the lithium salt-containing coating in the electrode active material layer may be measured through high performance liquid chromatography (HPLC) analysis. For example, 0.5 g of an electrode active material sample, which is obtained from the electrode active material layer and has a lithium salt-containing coating formed thereon, may be added to 10 g of DI water (0.1% trifluoroacetic acid (TFA)), then subjected to ultrasonic extraction for 20 minutes. Thereafter, the sample may be pretreated by mixing the extracted solution for 12 hours and filtering the mixture with a syringe filter (Whatman, 67502502). Then, a content of the lithium salt-containing coating may be measured by performing HPLC analysis on the pretreated sample under the following analysis conditions. Specific compounds corresponding to each peak in the HPLC graph may be analyzed through an MS detector.

<HPLC Analysis Condition>
i) Device: Agilent HPLC 1200 Module
ii) Column: Agilent C18, 5 μm, 150*4.6 mm
iii) Column heater temperature: 30° C.
iv) Eluent: Water (0.1% trifluoroacetic acid):acetonitrile=9:1
v) Wavelength: 230 nm
vi) How rate: 1.0 ml/min
vii) Injection amount: 30 μl
viii) MS detector: Thermo Scientific, LTQ XL In some embodiments, the lithium salt-containing coating may have a form of a solid electrolyte having high lithium ion conductivity and low electronic conductivity. For example, the lithium salt-containing coating may have a lithium ion conductivity of $1\times10^{-7}$ S/cm or more and an electronic conductivity of $1\times10^{-5}$ S/cm or less. For example, the lithium ion conductivity and electronic conductivity may be calculated by measuring a resistance with electrochemical impedance spectroscopy (EIS) and then converting it into a thickness and an area of the lithium salt-containing coating.

In one embodiment, the lithium ion conductivity of the lithium salt-containing coating may be $1\times10^{-7}$ S/cm to $1\times10^{-2}$ S/cm, and for example, $1\times10^{-6}$ S/cm to $1\times10^{-2}$ S/cm. As the lithium salt-containing coating has high lithium ion conductivity, an increase in the resistance in the coating layer may be suppressed, and thus life-span characteristics, initial efficiency, and stability of the secondary battery may be further improved.

In one embodiment, the electronic conductivity of the lithium salt-containing coating may be $1\times10^{-9}$ S/cm or less, and for example, $1\times10^{-10}$ S/cm or less. As the lithium salt-containing coating has the above-described low electronic conductivity, oxidation/reduction or side reaction of the electrode active material may be prevented, and cycle characteristics and operation stability of the lithium secondary battery may be further improved.

In some embodiments, the electrode for a lithium secondary battery may be a cathode comprising a cathode active material. For example, the electrode current collector may be a cathode current collector, and the electrode active material layer may be a cathode active material layer.

In some embodiments, the electrode for a lithium secondary battery may be an anode comprising an anode active material. For example, the electrode current collector may be an anode current collector, and the electrode active material layer may be an anode active material layer.

In some embodiments, the cathode active material may comprise a lithium metal oxide, for example, a lithium (Li)-nickel (Ni) oxide or a lithium iron phosphate compound (LFePO$_4$). For example, the lithium (Li)-nickel (Ni) oxide comprised in the cathode active material layer may be represented by Formula 1 below.

$$Li_{1+a}Ni_{1-(x+y)}Co_xM_yO_2 \quad \text{[Formula 1]}$$

In Formula 1, a, x and y may be in a range of $-0.05\leq a\leq 0.15$, $0\leq x\leq 1$, $0\leq y\leq 1$, $0\leq x+y\leq 1$, respectively, and M may be one or more elements selected from the group consisting of Mg, Sr, Ba, B, Al, Si, Mn, Ti, Zr and W. In one embodiment, x and y may be in a range of $0.01\leq x\leq 0.2$, $0.01\leq y\leq 0.2$, respectively.

In one embodiment, in Formula 1, M may be manganese (Mn). In this case, nickel-cobalt-manganese (NCM) lithium oxide may be used as the cathode active material.

In some embodiments, the anode active material may comprise carbon-based materials such as crystalline carbon, amorphous carbon, carbon composite, carbon fiber, etc.; a lithium alloy; silicon and/or tin.

Examples of the amorphous carbon may comprise hard carbon, cokes, mesocarbon microbead (MCMB), mesophase pitch-based carbon fiber (MPCF) and/or the like.

Examples of the crystalline carbon may comprise graphite-based carbon such as natural graphite, graphite cokes, graphite MCMB, graphite MPCF and/or the like. As an element comprised in the lithium alloy, Al, Zn, Bi, Cd, At, Si, Pb, Sn, Ga or In may be used.

<Lithium Secondary Battery>

A lithium secondary battery according to example embodiments may comprise a cathode and an anode disposed to face the cathode, and the electrode for a lithium secondary battery comprising a lithium salt-containing coating may be at least one of the cathode and the anode, or both. For example, the lithium salt-containing coating may be included in the cathode, or included in the anode. For example, the lithium salt-containing coating may be included in both the cathode and the anode.

Figure 3:
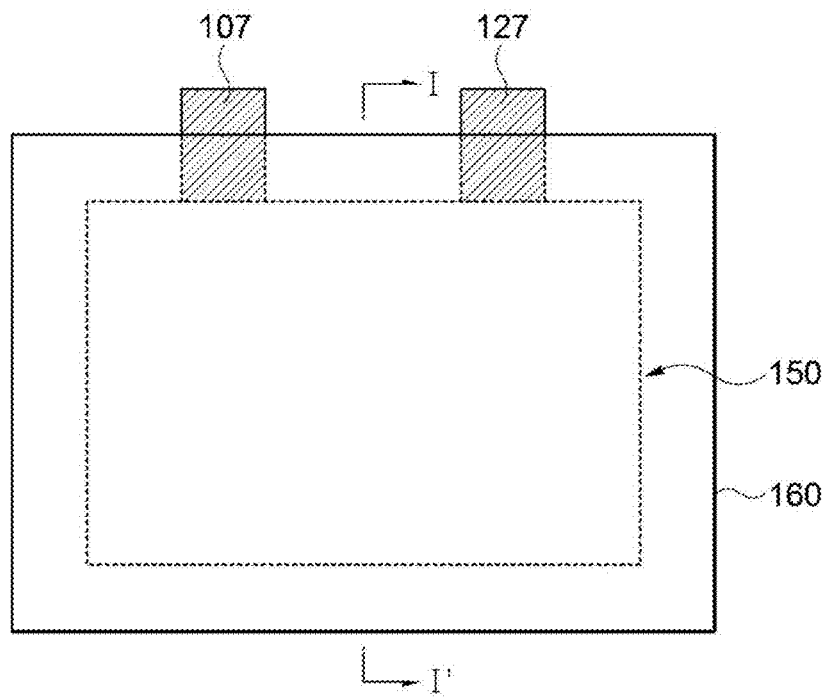
FIG. 3 is a schematic plan view illustrating a lithium secondary battery according to example embodiments.
Figure 4:
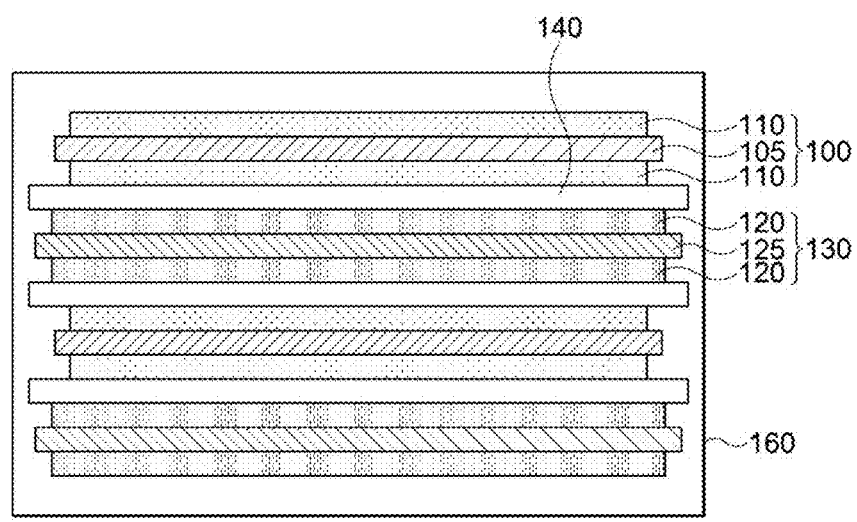
FIG. 4 is a schematic cross-sectional view illustrating an electrode assembly according to example embodiments.

FIGS. 3 and 4 are a schematic plan view and a cross-sectional view illustrating the secondary battery according to example embodiments, respectively. For example, FIG. 4 is a cross-sectional view taken on line I-I' shown in FIG. 3.

Referring to FIGS. 3 and 4, the secondary battery may comprise an electrode assembly 150 and a case 160 in which the electrode assembly 150 is housed. The electrode assembly 150 may comprise a cathode 100, an anode 130 and a separation membrane 140.

The cathode 100 may comprise a cathode current collector 105 and a cathode active material layer 110 formed on at least one surface of the cathode current collector 105. In one embodiment, the above-described lithium salt-containing coating may be formed on at least a portion of the surface of the cathode active material layer 110.

In some embodiments, the cathode active material layer 110 may be formed on both surfaces (e.g., upper and lower surfaces) of the cathode current collector 105. For example, the cathode active material layer 110 may be coated on the upper and lower surfaces of the cathode current collector 105, respectively, or may be directly coated on the surface of the cathode current collector 105.

The cathode current collector 105 may comprise, for example, stainless steel, nickel, aluminum, titanium, copper, or an alloy thereof, and preferably comprises aluminum or an aluminum alloy.

In some embodiments, in the case of the cathode active material layer 110, a cathode slurry may be coated on the cathode current collector 105, followed by compressing and drying to form the cathode active material layer 110. For example, the cathode slurry may be prepared by mixing the cathode active material with a binder, a conductive material and/or a dispersant in a solvent, followed by stirring the same. In some embodiments, the above-described lithium salt-containing coating may be formed on at least a portion of the surface of the cathode active material.

The binder may comprise, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for forming the cathode. In this case, an amount of the binder for forming the cathode active material layer 110 may be reduced and an amount of the cathode active material or lithium metal oxide particles may be relatively increased. Thereby, the output and capacity of the secondary battery may be further improved.

The conductive material may be comprised to facilitate electron transfer between the active material particles. For example, the conductive material may comprise a carbon-based conductive material such as graphite, carbon black, graphene, and/or carbon nanotubes and/or a metal-based conductive material such as tin, tin oxide, titanium oxide, and/or a perovskite material such as LaSrCoO$_3$, and LaSrMnO$_3$, etc.

In some embodiments, the cathode 100 may have an electrode density of 3.0 to 3.9 g/cc, and for example, 3.2 to 3.8 g/cc.

The anode 130 may comprise an anode current collector 125 and an anode active material layer 120 formed on at least one surface of the anode current collector 125. In some embodiments, the lithium salt-containing coating may be formed on at least a portion of the surface of the anode active material layer 120.

In some embodiments, the anode active material layer 120 may be formed on both surfaces (e.g., upper and lower surfaces) of the anode current collector 125. The anode active material layer 120 may be coated on the upper and lower surfaces of the anode current collector 125, respectively, and may be in direct contact with the surface of the anode current collector 125.

The anode current collector 125 may comprise gold, stainless steel, nickel, aluminum, titanium, copper or an alloy thereof, and preferably comprises copper or a copper alloy.

In some embodiments, in the case of the anode active material layer 120, an anode slurry may be applied (coated) to the anode current collector 125, followed by compressing and drying to form the anode active material layer 120. For example, the anode slurry may be prepared by mixing the anode active material with a binder, a conductive material and/or a dispersant in a solvent, followed by stirring the same. In some embodiments, the above-described lithium salt-containing coating may be formed on at least a portion of the surface of the anode active material.

Materials substantially the same as or similar to those used for forming the cathode 100 may be used as the binder and the conductive material. In some embodiments, the binder for forming the anode 130 may comprise, for example, styrene-butadiene rubber (SBR) or an acrylic binder for consistency with the graphite-based active material, and may be used together with a thickener such as carboxymethyl cellulose (CMC).

In some embodiments, the anode active material layer 120 may have a density of 1.4 to 1.9 g/cc.

In some embodiments, the anode 130 may have an area (e.g., a contact area with the separation membrane 140) and/or volume larger than those/that of the cathode 100. Thereby, lithium ions generated from the cathode 100 may smoothly move to the anode 130 without being precipitated in the middle, such that output and capacity characteristics may be further improved.

The separation membrane 140 may be interposed between the cathode 100 and the anode 130. The separation membrane 140 may comprise a porous polymer film made of a polyolefin polymer such as ethylene homopolymer, propylene homopolymer, ethylene/butene copolymer, ethylene/hexene copolymer, ethylene/methacrylate copolymer. The separation membrane may comprise a nonwoven fabric made of glass fiber having a high melting point, polyethylene terephthalate fiber or the like.

The separation membrane 140 may extend between the cathode 100 and the anode 130, and may be folded and wound in a thickness direction of the lithium secondary battery. Accordingly, a plurality of cathodes 100 and anodes 130 may be laminated in the thickness direction with the separation membrane 140 interposed therebetween.

In some embodiments, an electrode cell is defined by the cathode 100, the anode 130, and the separation membrane 140, and a plurality of electrode cells are laminated to form, for example, a jelly roll type electrode assembly 150. For example, the electrode assembly 150 may be formed by winding, lamination, folding, or the like of the separation membrane 140.

The electrode assembly 150 is housed in the case 160, and an electrolyte may be injected into the case 160 together. The case 160 may comprise, for example, a pouch, a can, or the like in shape.

In some embodiments, a non-aqueous electrolyte may be used as the electrolyte.

The non-aqueous electrolyte comprises a lithium salt of an electrolyte and an organic solvent, the lithium salt is represented by, for example, $Li^+X^-$, and as an anion ($X^-$) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide (DMSO), acetonitrile, dimethoxyethane, diethoxyethane, vinylene carbonate, sulfurane, γ-butyrolactone, propylene sulfite, tetrahydrofurane, and/or the like may be used. These compounds may be used alone or in combination of two or more thereof.

In some embodiments, the lithium salt-containing coating in the electrolyte may have a solubility of 1 g/L or less, and preferably 0.1 g/L or less. For example, the lithium salt-containing coating may have the above-described low solubility in the organic solvent comprised in the electrolyte.

Accordingly, the lithium salt-containing coating may have improved chemical stability, and low reactivity to the electrolyte, such that deterioration of the electrode active material layer by the electrolyte may be suppressed. Accordingly, a lithium secondary battery having an improved capacity retention rate and high efficiency even during repeated charging/discharging behaviors may be provided.

As shown in FIG. 3, electrode tabs (a cathode tab and an anode tab) may protrude from the cathode current collector 105 and the anode current collector 125, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

FIG. 3 illustrates that the cathode lead 107 and the anode lead 127 are formed on the same side of the lithium secondary battery or the case 160, but these electrode leads may be formed on sides opposite to each other.

For example, the cathode lead 107 may be formed on one side of the case 160, and the anode lead 127 may be formed on the other side of the case 160.

The lithium secondary battery may be manufactured, for example, in a cylindrical shape using a can, a square shape, a pouch type or a coin shape.

Hereinafter, experimental examples including specific examples and comparative examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

EXAMPLES AND COMPARATIVE EXAMPLES (1) Preparation of Anode Active Material Including Lithium Salt-Containing Coating 100 g of artificial graphite (D50: 10 μm) was prepared as an anode active material.

Thereafter, a process of forming a lithium salt-containing coating was performed. Specifically, a coating solution, in which 5 wt. % of lithium benzoate ($C_7H_5LiO_2$) was dissolved in a mixed solvent of water and ethanol, was put into a vacuum planetary mixer (Kurabo mixer manufactured by KURABO), and the prepared anode active material was added, followed by mixing at a stirring speed of 20 Hz for 2 hours. Then, the mixture was dried for 24 hours in a vacuum state and at a temperature of 60° C. to form a lithium salt-containing coating having a thickness shown in Table 1 below.

In Table 1 below, "O" denotes an anode active material in which the lithium salt-containing coating is formed. "X" denotes an anode active material in which the lithium salt-containing coating is not formed. The anode active material, in which the lithium salt-containing coating is not formed, was prepared in the same manner except for omitting the process of forming a lithium salt-containing coating.

(2) Preparation of Anode Active Material Layer Including Lithium Salt-Containing Coating and Secondary Battery A composition for an anode was prepared by mixing the prepared anode active material, conductive material (carbon black), binder (SBR), and thickener (CMC) in a ratio of 94:3:1.5:1.2. The prepared composition for an anode was applied to a Cu foil, dried and rolled to prepare an anode active material layer having a slurry density of 10 mg/cm$^2$ and 1.7 g/cc.

Thereafter, a process of forming a lithium salt-containing coating was performed. Specifically, a coating solution, in which 5 wt. % of lithium benzoate ($C_7H_5LiO_2$) was dissolved in a mixed solvent of water and ethanol, was applied to the anode active material layer, and then dried in a convection oven under a temperature condition of 60° C. for 24 hours to form a lithium salt-containing coating having a thickness listed in Table 1 below.

A coin cell type secondary battery was manufactured using an Li foil as a counter electrode and an electrolyte containing 1 M $LiPF_6$ in a mixed solvent of EC and EMC (EC:EMC=3:7).

In Table 1 below, "O" denotes an anode active material layer in which the lithium salt-containing coating is formed. "K" denotes an anode active material layer in which a lithium salt-containing coating is not formed. The anode active material layer, in which a lithium salt-containing coating is not formed, was prepared in the same manner except for omitting the process of forming a lithium salt-containing coating.

(3) Measurement of Arithmetic Average Value of Surface Roughness (Ra) of Anode 50 or more arbitrary regions of an upper surface of the prepared anode were designated and the roughness (i.e., center line average roughness) in each region was measured 15 times using an atomic force microscopy (Icon, Broker Co.) under a condition of an XY scan range of 0.5 μm×0.5 μm. The surface roughness value in each region was calculated as an arithmetic average value of values excluding the maximum and minimum values among the measured values.

Thereafter, the Ra value of the anode was calculated as the arithmetic average value of the surface roughness values of each region.

Figure 5:
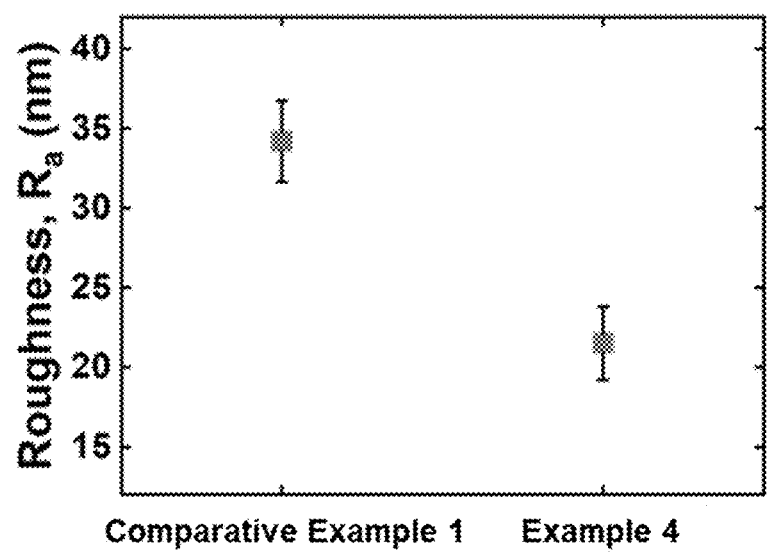
FIG. 5 is a graph illustrating the distribution of surface roughness values measured on anodes according to Example 4 and Comparative Example 1.

FIG. 5 is a graph illustrating the distribution of surface roughness values measured on anodes according to Example 4 and Comparative Example 1.

Referring to FIG. 5, the anode of Example 4 has a low arithmetic average value of the surface roughness values measured therefrom as a whole, and a relatively narrow distribution. Accordingly, the anode may have a low standard deviation value of the surface roughness values, and a relatively constant roughness over the entire area of the surface thereof.

However, the anode according to Comparative Example 1 has a high arithmetic average value of the surface roughness values measured therefrom as a whole, and a relatively wide distribution. Therefore, it could be confirmed that the deviation of the roughness values for each region of the anode surface was high, and the roughness uniformity of the anode was low.

The standard deviation of the surface roughness values measured on the anode according to Example 4 was 2.3 nm, and the standard deviation of the surface roughness values measured on the anode according to Comparative Example 1 was 2.56 nm.

(4) Measurement of Content (Ppm) of Lithium Salt-Containing Coating

After performing charging (CC/CV 0.5 C 4.2 V 0.05 C CUT-OFF) and discharging (CC 0.5 C 2.5 V CUT-OFF) on the prepared secondary battery, 0.5 g of an anode active material sample was obtained from the anode active material layer.

The obtained sample was added to 10 g of DI water (0.1% trifluoroacetic acid (TFA)) and subjected to ultrasonic extraction for 20 minutes, then the extracted solution was mixed for 12 hours and filtered through a syringe filter. HPLC analysis was performed on the sample filtered under the following HPLC analysis conditions to measure a content of the lithium salt-containing coating.

<HPLC Analysis Condition>
i) Device: Agilent HPLC 1200 Module
ii) Column: Agilent C18, 5 μm, 150*4.6 mm
iii) Column heater temperature: 30° C.
iv) Eluent: Water (0.1% trifluoroacetic acid):acetonitrile=9:1
v) Wavelength: 230 nm
vi) How rate: 1.0 ml/min
vii) Injection volume: 30
viii) MS detector: Thermo Scientific, LTQ XL

TABLE 1

| | Anode active material | | Anode active material layer | | | Arithmetic average value of surface |
|---|---|---|---|---|---|---|
| | Whether coating formed | Coating thickness (nm) | Whether coating formed | Coating thickness (nm) | Coating content (ppm) | roughness (Ra)ss (nm) |
| Example 1 | X | — | O | 100 | 80 | 19 |
| Example 2 | X | — | O | 400 | 180 | 15 |
| Example 3 | X | — | O | 1200 | 350 | 10 |
| Example 4 | O | 50 | X | | 30 | 23 |
| Example 5 | O | 350 | X | | 170 | 15 |
| Example 6 | O | 1100 | X | | 300 | 8 |
| Example 7 | O | 50 | O | 100 | 50 | 14 |
| Example 8 | O | 100 | O | 50 | 100 | 10 |
| Example 9 | O | 100 | O | 100 | 150 | 7 |
| Comparative Example 1 | X | — | X | — | 0 | 35 |
| Comparative Example 2 | O | 2000 | X | — | 1500 | 52 |
| Comparative Example 3 | X | — | O | 3000 | 2000 | 48 |

Figure 6:
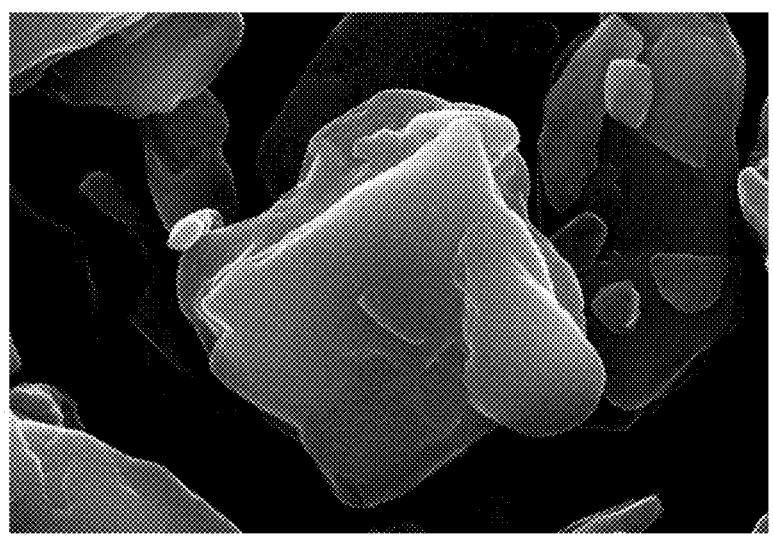
FIG. 6 is an atomic force microscopy (AFM) image illustrating the surface of the electrode for a lithium secondary battery according to Example 4.
Figure 7:
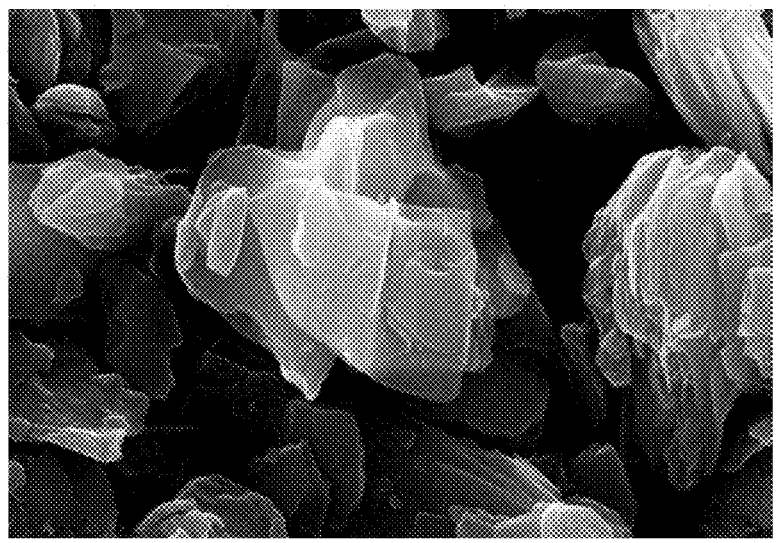
FIG. 7 is an atomic force microscopy (AFM) image illustrating the surface of the electrode for a lithium secondary battery according to Comparative Example 1.

Experimental Example (1) Evaluation of Surface Characteristics of Upper Surface of Anode FIG. 6 is an atomic force microscopy (AFM) image illustrating an upper surface of the anode according to Example 4, and FIG. 7 is an atomic force microscopy image illustrating an upper surface of the anode according to Comparative Example 1.

Referring to FIGS. 5 and 6, the anode according to Example 4 exhibited that the arithmetic average roughness was 23 nm or less, and the upper surface of the anode was uniform.

Referring to FIG. 7, the anode according to Comparative Example 1 exhibited that the lithium salt-containing coating was not formed on both the anode active material and the anode active material layer, and the upper surface of the anode was non-uniform.

(2) Evaluation of Initial Efficiency

Charging (CC/CV 0.5 C 4.2 V 0.05 C CUT-OFF) and discharging (CC 0.5 C 2.5 V CUT-OFF) were performed on the secondary batteries according to the examples and comparative examples to measure initial charge/discharge capacities (CC: Constant Current, CV: Constant Voltage). The initial efficiency was evaluated as a percentage of the value obtained by dividing the initial discharge capacity by the initial charge capacity.

(3) Evaluation of Capacity Retention Rate 300 cycles of charging/discharging were repeatedly performed on the secondary batteries according to the examples and comparative examples in a way of executing charging (CC/CV method, current rate 0.5 C, upper limit voltage 4.2 V, cut-off current 0.05 C) and discharging (CC, 0.5 C, lower limit voltage 2.5 V cut-off) at 25° C. was set to be one cycle. Thereafter, the capacity retention rate was evaluated as a percentage of the value obtained by dividing the discharge capacity at 300 cycles by the discharge capacity at one cycle.

Evaluation results are shown in Table 2 below.

TABLE 2

| Item | Initial efficiency (%) | Capacity retention rate (%) (@300 cycle) |
|---|---|---|
| Example 1 | 95.8 | 93.1 |
| Example 2 | 95.6 | 93.1 |
| Example 3 | 95.4 | 92.9 |
| Example 4 | 95.0 | 93.3 |
| Example 5 | 95.7 | 92.9 |
| Example 6 | 95.5 | 92.6 |
| Example 7 | 95.6 | 92.8 |
| Example 8 | 95.4 | 92.7 |
| Example 9 | 96.8 | 95.8 |
| Comparative Example 1 | 92.3 | 89.1 |
| Comparative Example 2 | 93.3 | 90.1 |
| Comparative Example 3 | 92.8 | 89.5 |

Referring to Table 2, the secondary batteries of the examples, which include the lithium salt-containing coatings, exhibited that the arithmetic average value of surface roughness of the anode was 25 nm or less, and the initial efficiency and capacity retention rate were improved.

On the other hand, the secondary battery of Comparative Example 1, which does not include the lithium salt-containing coating, exhibited that the arithmetic average value of surface roughness of the anode was greater than 25 nm, and the initial efficiency and capacity retention rate were decreased.

In addition, the secondary batteries of Comparative Examples 2 and 3 exhibited that the surface roughness values were high, and the initial efficiency and cycle characteristics were decreased.

Meanwhile, the secondary batteries of Examples 7 to 9 exhibited that, since the lithium salt-containing coatings were formed on the surface of the anode active material and the surface of the anode active material layer, the performance of the secondary battery was improved as a whole.

What is claimed is:

1. An electrode for a lithium secondary battery comprising:
    an electrode current collector;
    an electrode active material layer disposed on at least one surface of the electrode current collector and comprising electrode active material particles; and
    a lithium salt-containing coating formed on at least portions of surfaces of the electrode active material particles and/or at least a portion of a surface of the electrode active material layer,
    wherein the electrode has an arithmetic average value of surface roughness (Ra) represented by Equation 1:

$$Ra \leq 25 \text{ nm} \quad \text{[Equation 1]}$$

wherein, in Equation 1, Ra is a value obtained by calculating an arithmetic average of surface roughness values measured in 20 or more measurement regions of the surface of the electrode using an atomic force microscopy in a scan range of 0.5 μm×0.5 μm.

2. The electrode for a lithium secondary battery according to claim 1, wherein the arithmetic average value of surface roughness (Ra) is 0.1 nm to 25 nm.

3. The electrode for a lithium secondary battery according to claim 1, wherein a surface roughness value measured in each of the measurement regions is an arithmetic average value of surface roughness values excluding a maximum value and a minimum value among the roughness values measured 15 or more times in a scan range of 0.5 μm×0.5 μm for each of the measurement regions.

4. The electrode for a lithium secondary battery according to claim 1, wherein a standard deviation of the surface roughness values measured in the measurement regions of the surface of the electrode is 2.5 nm or less.

5. The electrode for a lithium secondary battery according to claim 1, wherein the lithium salt-containing coating has a continuous film shape which covers the surfaces of the electrode active material particles or the surface of the electrode active material layer.

6. The electrode for a lithium secondary battery according to claim 1, wherein the lithium salt-containing coating has a thickness of 1 nm to 1,000 nm.

7. The electrode for a lithium secondary battery according to claim 1, wherein the lithium salt-containing coating comprises at least one of LiCl, LiF, $Li_3PO_4$, $LiBO_2$, $LiIO_2$, $Li_2CO_3$, $Li_2B_4O_7$, $Li_2SO_4$, LiBr, LiI, $LiNO_3$, $Li(CF_3CO_2)$, $Li((CH_3)_3SiO)$, $Li(CH_3O)$, $LiCH_2COO$, $Li(CO_2CH_3)$, $(CH_3)_2CHOLi$ (lithium isopropoxide), $CH_3CH(OH)COOLi$ (lithium lactate), $Li_2S$, LiOH, $Li_2O$, $Li_2O_2$, $CH_3CH_2OLi$ (lithium ethoxide), $C_6H_5OLi$ (lithium phenoxide) and/or $C_7H_5LiO_2$ (lithium benzoate).

8. The electrode for a lithium secondary battery according to claim 1, wherein a content of the lithium salt-containing coating measured by high performance liquid chromatography (HPLC) is 20 ppm to 600 ppm based on a total weight of the electrode active material layer.

9. The electrode for a lithium secondary battery according to claim 1, wherein the lithium salt-containing coating is formed on both the surfaces of the electrode active material particles and the surface of the electrode active material layer.

10. The electrode for a lithium secondary battery according to claim 1, wherein the lithium salt-containing coating has a lithium ion conductivity of $1 \times 10^{-7}$ S/cm or more and an electronic conductivity of $1 \times 10^{-5}$ S/cm or less.

11. The electrode for a lithium secondary battery according to claim 1, wherein the electrode is an anode or a cathode.

12. A lithium secondary battery comprising:
a cathode; and
an anode facing the cathode,
wherein at least one of the cathode and the anode is the electrode for a lithium secondary battery according to claim 1.

13. The lithium secondary battery according to claim 12, further comprising an electrolyte immersing the cathode and the anode,
wherein the lithium salt-containing coating has a solubility of 1 g/L or less in the electrolyte.

* * * * *